United States Patent
Parker et al.

(10) Patent No.: US 9,052,250 B1
(45) Date of Patent: Jun. 9, 2015

(54) METHOD OF CALIBRATING A FORCE BALANCE

(71) Applicant: The United States of America as represented by the Administrator of the United States National Aeronautics and Space Administration, Washington, DC (US)

(72) Inventors: Peter A. Parker, Gloucester, VA (US); Ray D. Rhew, Suffolk, VA (US); Thomas H. Johnson, Alexandria, VA (US); Drew Landman, Norfolk, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 13/860,697

(22) Filed: Apr. 11, 2013

Related U.S. Application Data

(60) Provisional application No. 61/642,613, filed on May 4, 2012.

(51) Int. Cl.
*G01L 25/00* (2006.01)
*G01G 23/01* (2006.01)
*G01L 3/00* (2006.01)
*G01P 21/00* (2006.01)

(52) U.S. Cl.
CPC ................. *G01L 25/00* (2013.01); *G01P 21/00* (2013.01)

(58) Field of Classification Search
CPC ........... G01L 25/00; G01L 1/22; G06F 19/00; G01M 1/16; G01G 23/01
USPC ....................... 73/1.08–1.11, 1.13, 1.15, 1.47
See application file for complete search history.

(56) References Cited

U.S. PATENT DOCUMENTS

| | | |
|---|---|---|
| 3,352,164 A | 11/1967 | Rosen |
| 4,414,838 A | 11/1983 | Ward et al. |
| 4,620,436 A | 11/1986 | Hirabayashi et al. |
| 4,711,125 A | 12/1987 | Morrison |
| 4,869,092 A | 9/1989 | Bernard et al. |
| 5,153,494 A * | 10/1992 | Hollis, Jr. ...................... 318/640 |
| 5,279,144 A | 1/1994 | Levkowitch |
| 5,421,187 A | 6/1995 | Morgan |

(Continued)

OTHER PUBLICATIONS

Parker, P. A., et al., "A Study of Automatic Balance Calibration System Capabilities," Second International Symposium on Strain Gause Balances, May 4-7, 1999, pp. 1-22, Bedford, United Kingdom.

(Continued)

*Primary Examiner* — Eric S McCall
*Assistant Examiner* — Anthony W Megna Fuentes
(74) *Attorney, Agent, or Firm* — Andrea Z. Warmbier

(57) ABSTRACT

A calibration system and method utilizes acceleration of a mass to generate a force on the mass. An expected value of the force is calculated based on the magnitude and acceleration of the mass. A fixture is utilized to mount the mass to a force balance, and the force balance is calibrated to provide a reading consistent with the expected force determined for a given acceleration. The acceleration can be varied to provide different expected forces, and the force balance can be calibrated for different applied forces. The acceleration may result from linear acceleration of the mass or rotational movement of the mass.

14 Claims, 4 Drawing Sheets

(56) References Cited

U.S. PATENT DOCUMENTS

| | | |
|---|---|---|
| 5,531,115 A | 7/1996 | Erdley |
| 5,533,380 A | 7/1996 | Ferris |
| 5,646,476 A | 7/1997 | Aston |
| 5,663,497 A | 9/1997 | Mole |
| 5,959,427 A * | 9/1999 | Watson .................. 318/687 |
| 5,981,941 A | 11/1999 | Takata et al. |
| 6,209,383 B1 | 4/2001 | Mueller et al. |
| 6,313,414 B1 * | 11/2001 | Campbell .................. 177/16 |
| 6,421,622 B1 | 7/2002 | Horton et al. |
| 6,526,821 B1 | 3/2003 | Corda et al. |
| 6,564,626 B2 | 5/2003 | Ulman et al. |
| 6,629,446 B2 * | 10/2003 | Parker .................. 73/1.15 |
| 6,729,176 B2 | 5/2004 | Begin |
| 6,758,080 B1 | 7/2004 | Ragan et al. |
| 6,778,924 B2 | 8/2004 | Hanse |
| 6,813,584 B2 | 11/2004 | Zhou et al. |
| 6,823,279 B1 | 11/2004 | Nadkarni et al. |
| 6,826,502 B2 | 11/2004 | Savard |
| 6,834,528 B2 | 12/2004 | Kappi et al. |
| 6,853,947 B1 | 2/2005 | Horton |
| 6,918,299 B2 | 7/2005 | Vanzandt et al. |
| 6,968,281 B2 | 11/2005 | Hanse |
| 7,077,001 B2 | 7/2006 | Carlson |
| 7,127,942 B2 | 10/2006 | Gibson |
| 7,299,556 B2 | 11/2007 | Lippuner |
| 7,359,047 B2 | 4/2008 | Lippuner |
| 7,467,536 B2 | 12/2008 | Finley et al. |
| 8,698,447 B2 | 4/2014 | Lumsden et al. |
| 8,762,009 B2 | 6/2014 | Ehrman et al. |
| 8,825,274 B2 | 9/2014 | De Tommasi |
| 8,850,258 B2 | 9/2014 | Lossin et al. |
| 2002/0088268 A1 | 7/2002 | Parker |
| 2005/0126024 A1 | 6/2005 | Kunzi et al. |
| 2005/0166410 A1 | 8/2005 | Richter et al. |
| 2006/0164073 A1 | 7/2006 | Bergsma |
| 2007/0124097 A1 | 5/2007 | Geck et al. |
| 2008/0177492 A1 | 7/2008 | Woodmansee et al. |

OTHER PUBLICATIONS

Ferris, A. T., A Strain Gauge Balance Calibration and Data Reduction at NASA Langley Research Center, First International Symposium on Strain Gauge Balances, Mar. 1, 1999, pp. 565-572, Hampton, Virginia.

Lockwood, C., et al., "Capabilities of NASA Ames Research Center's Automated Balance Calibration Machine," Second International Symposium on Strain-Gauge Balances, May 4-7, 1999, pp. 1-17.

Badet, L. M., "Cryogenic Internal Balance Calibration at ETW," AGARD FDP Special Course on Advances in Cryogenic Wind Tunnel Technology, May 20-24, 1996, pp. 14-1-14-15, Koln, Germany.

Polansky, L., et al., "A New and Working Automatic Calibration Machine for Wind Tunnel Internal Force Balances," AIAA 29th Joint Propulsion Conference and Exhibit, Jun. 28-30, 1993, pp. 1-15, Monterey, CA.

Levkovitch, Michael, "Accuracy Analysis of the IAI Mark II ABCS," IAI Engineering Division Commercial Aircraft Group, Jul. 1995, pp. 1-23, Israel.

Levkovitch, M., "Automatic Balance Calibrator at Israel Aircraft Industries", IAI Engineering Center Aircraft Division, Jan. 1993, pp. 1-23.

China Aerodynamics Research & Development Center—BCL-30000, "Fully Automatic Balance Calibration System," 1997, pp. 1-4.

IAI Engineering Division Brochure—Mark IV ABCS, "Automatic Balance Calibration System," 1991, 6 pgs.

Parker, P. A., et al., "A Single-Vector Force Calibration Method Featuring the Modern Design of Experiments (Invited)," 39th AIAA Aerospace Sciences Meeting & Exhibit, Jan. 8-11, 2001, pp. 1-27, Reno, Nevada.

"Single-Vector Calibration of Wind-Tunnel Force Balances," Website, wysiwyg://204/http://www.nasatech.com/Briefs/Oct03/LAR16020.html, accessed on, Dec. 10, 2005, pp. 1-3.

Entran Multi-Axis Accelerometers, Website, http://www.entran.com/ege3.htm, accessed on, Dec. 10, 2005, pp. 1-5.

* cited by examiner

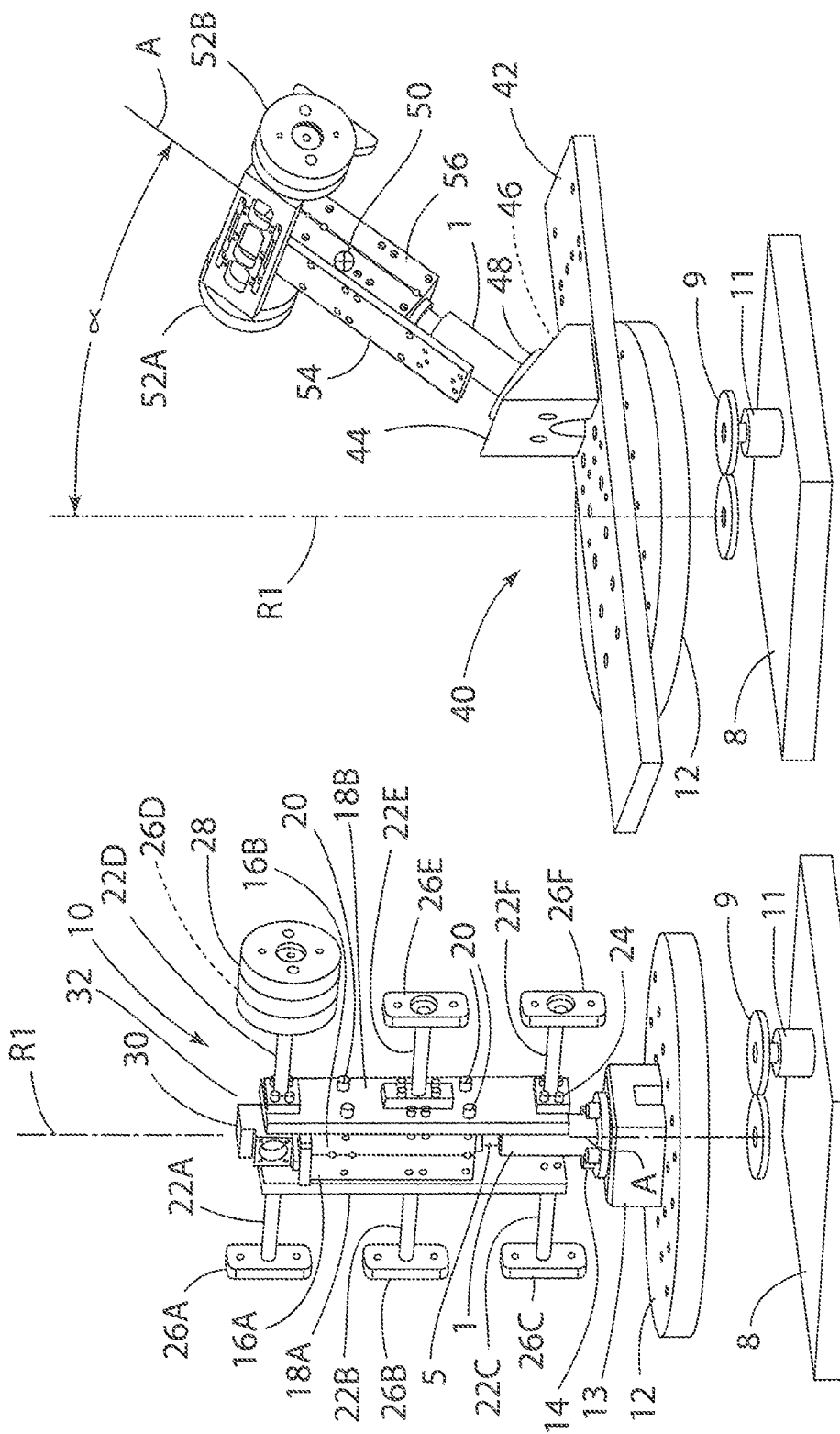

METHOD OF CALIBRATING A FORCE BALANCE

CROSS-REFERENCE TO RELATED PATENT APPLICATION(S)

This patent application claims the benefit of and priority to U.S. Provisional Patent Application No. 61/642,613, filed on May 4, 2012, the contents of which are hereby incorporated by reference in their entirety.

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

FIELD OF THE INVENTION

The present invention generally relates to the field of precision force measurement systems. In particular, the present invention relates to a system for calibrating high precision multi-axis load cells such as wind tunnel force balances. An example of a wind tunnel force balance is disclosed in U.S. Pat. No. 5,663,497 entitled "Six Component Wind Tunnel Balance," the entire contents of which are incorporated herein by reference. Strain gauge force balances are often used to measure forces applied to an object in a controlled test environment. These balances are commonly used to measure three components of aggregate force (axial, side, and normal, or vertical, forces; i.e. Fx, Fy, Fz), as well as three moments (roll, pitch, and yaw; i.e. Mx, My, Mz). Force balances have been utilized for years, especially in the aerodynamic research industry. Force balances are used in the estimation of important aerodynamic performance coefficients based on testing scaled aircraft models in wind tunnels.

Force balances have been calibrated manually, using a complex system of free hanging precision weights, bell cranks, and/or other mechanical components. Other methods may provide sufficient accuracy in some instances, but are often quite complex and labor-intensive, requiring a significant amount of time to complete each full calibration. To ensure accuracy, gravity-based loading is typically utilized. However, this often causes difficulty when applying loads in three simultaneous, orthogonal axes. A complex system of levers, cranks, and cables must be used, introducing increased sources of systematic error, and significantly increasing the time and labor intensity required to complete the calibration.

DESCRIPTION OF THE RELATED ART

Semi-automatic methods for calibrating force balances have been used in the art. Fully automated designs have been used to reduce the time involved in calibrating a balance; however, the new designs still have significant disadvantages.

These calibration systems are typically not portable, and must be installed at a fixed location. In addition, the calibration system accuracy may be difficult to experimentally verify. Because system accuracy is based on the combined accuracy of multiple load cells and position sensors, complex loads tend to make the resolution of force and moment vector orientation and magnitude relative to the coordinate system of the multi-axis load cell undergoing calibration extremely critical in overall system performance.

However, known force calibration systems suffer from various drawbacks.

SUMMARY OF THE INVENTION

One aspect of the present invention is a system and method wherein the mass utilized for calibration is held constant, and the acceleration is changed to thereby generate relatively large forces with relatively small test masses. Multiple forces can be applied to a force balance without changing the test mass, and dynamic forces can be applied by rotation or oscillating acceleration. If rotational motion is utilized, a mass is rigidly attached to a force balance, and the mass is exposed to a rotational field. A large force can be applied by utilizing a large rotational velocity. A centrifuge or rotating table can be used to create the rotational field, and fixtures can be utilized to position the force balance. The acceleration may also be linear. For example, a table that moves linearly and accelerates in a sinusoidal manner may also be utilized. The test mass does not have to move in a path that is parallel to the ground, and no re-leveling is therefore required. Balance deflection corrections may be applied passively by monitoring the orientation of the force balance with a three-axis accelerometer package. Deflections are measured during each test run, and adjustments with respect to the true applied load can be made during the post-processing stage.

A method of calibrating a force balance according to one aspect of the present invention includes providing a force balance to be calibrated. A test mass having a known magnitude is operably interconnected to the force balance, and the test mass is caused to accelerate by moving in a linear or a circular path. If the mass is rotated, the angular velocity generates a load on the force balance due to centripetal acceleration acting on the test mass. Alternately, the test mass may be moved and accelerated linearly. An expected force can be calculated utilizing the magnitude of the mass, position of the mass, and the acceleration of the mass. The output of the force balance is calibrated to provide a reading that is consistent with the magnitude of the expected force. The acceleration of the mass can be varied, and additional expected forces can be calculated for each acceleration. The expected forces can be utilized to further calibrate the force balance.

These and other features, advantages, and objects of the present invention will be further understood and appreciated by those skilled in the art by reference to the following specification, claims, and appended drawings.

BRIEF DESCRIPTION OF THE DRAWINGS

FIG. 3 is an isometric view of a centered system for calibrating a force balance;

FIG. 4 is an isometric view of an off-center system for calibrating a force balance.

DETAILED DESCRIPTION OF THE INVENTION

For purposes of description herein, the terms "upper," "lower," "right," "left," "rear," "front," "vertical," "horizontal," and derivatives thereof shall relate to the invention as oriented in FIGS. 3 and 4. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The following nomenclature is utilized herein:

$\omega$=angular velocity $\alpha$=angle between the table rotational axis and earth's gravitational vector $\theta$=angle between the axis of the balance and the table rotation axis R=arm distance (only used for the centered system)

Figure 1:
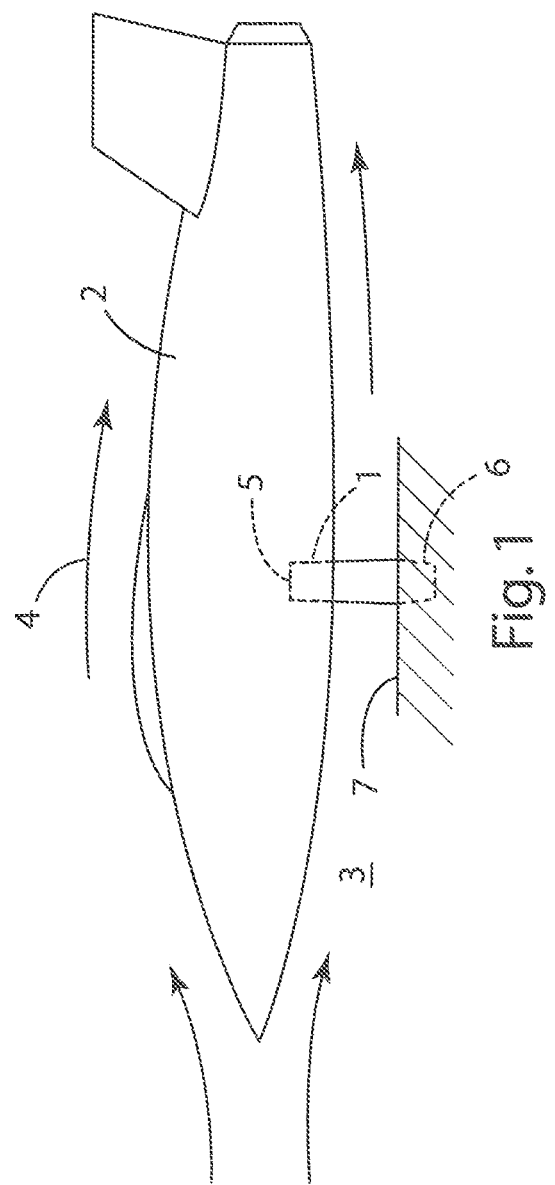
FIG. 1 is a partially schematic view of an aircraft model supported by a force balance in a wind tunnel for testing.

D=moment arm distance along balance axis m=attached mass $T_x$=translational offset between balance attachment point on the table and the axis of rotation L=distance from the balance attachment point on the table to the balance moment center along the balance axis $\phi$=deflection angle of the arm With reference to FIG. 1, a force balance 1 may be utilized to support a model aircraft 2 or other component in a wind tunnel 3 to measure forces acting on the model 2 due to airflow 4.

A typical wind tunnel internal balance 1 is a six degree of freedom force and moment transducer, capable of measuring an aerodynamic normal force (NF), side force (SF), axial force (AF), pitching moment (PM), yawing moment (YM), and rowing moment (RM) by monitoring structural deformation with strain gauges. The balance is said to be "internal" because the instrument is mounted within the wind tunnel model. It will be understood that the present invention may also be utilized in connection with other types of force balances (e.g. external force balances). In the illustrated example, the force balance 1 includes a metric (cylindrical) end 5 that connects to the aircraft model 2, and a non-metric (tapered) end 6 that is attached to a support structure 7 in the wind tunnel 3. The present invention may also be utilized in connection with other types of force balances having different configurations.

A variable acceleration calibration system according to one aspect of the present invention utilizes centripetal and gravitational acceleration to apply loads to a force balance 1. As discussed in more detail below, another aspect of the present invention includes utilizing linear acceleration to apply a variable load to a force balance.

If rotational motion/acceleration is utilized, a mass is rigidly attached to the force balance and it is exposed to a rotational field. The resulting (expected) force imparted by the attached mass is shown in equation (1).

$$F = mg + mr\omega^2 \qquad (1)$$

A large force can be applied using a relatively small amount of weight using a large rotational velocity. As a result, a smaller amount of weight is moved during the calibration process leading to a decrease in calibration time compared to known calibration systems. As discussed in more detail below, a centrifuge or rotating table can be used to create the rotational field, and fixtures may be utilized to position the balance.

A variable acceleration calibration system according to the present invention is advantageous in that the attached mass does not have a parallel (i.e. parasitic) load path to ground. Balance deflection corrections are applied passively by monitoring the orientation of the balance with a three-axis accelerometer package that provides an attitude sensing system. Deflections are measured during each run at specified angular velocities from which adjustments of the true applied load can be made during the post processing stage.

Figure 2:
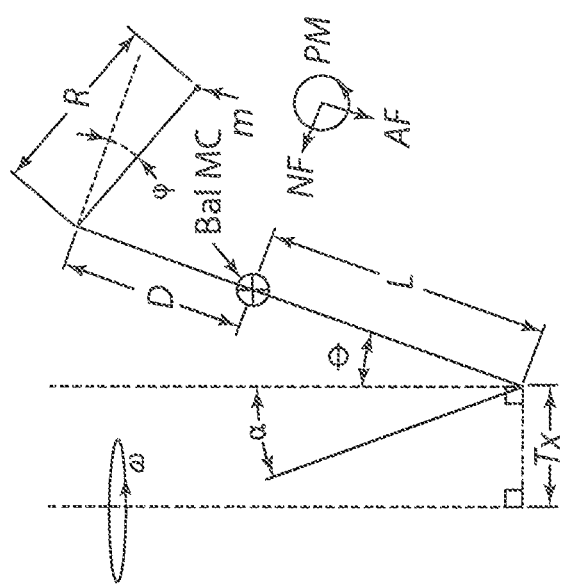
FIG. 2 is a schematic view of the geometry of a calibration system according to one aspect of the present invention.

A two dimensional representation of a generic variable acceleration calibration system is shown in FIG. 2. Equations (2-4) determine the (expected) component loads on the balance. These governing equations assume constant rotational velocity. The loading event is periodic when $\alpha$ is non zero. However, this analysis calculates the average load during one revolution, allowing for a static representation of the (expected) loads exerted on the balance.

$$NF = -m\omega^2[T_x + \sin(\theta)(L+D) + \cos(\phi)\cos(\theta)R - \sin(\phi)\sin(\theta)R]\cos(\theta) - mg\cos(\alpha)\sin(\theta) \qquad (2)$$

$$AF = -m\omega^2[T_x + \sin(\theta)(L+D) + \cos(\phi)\cos(\theta)R - \sin(\phi)\sin(\theta)R]\sin(\theta) + mg\cos(\alpha)\cos(\theta) \qquad (3)$$

$$PM = [\cos(\phi)D - \sin(\phi)R]NF - [\sin(\phi)D + \cos(\phi)R]AF \qquad (4)$$

With reference to FIG. 3, a first calibration system 10 is referred to as a "centered system". Force balance 1 is mounted to a rotational table 12 utilizing a mounting structure 13 and threaded fasteners 14 to thereby rigidly retain the force balance 1 with the axis "A" of the force balance 1 aligned with the rotational axis "R1" of a rotational table 12. Rotational table 12 may comprise a known device that includes a powered actuator such as electric motor 11, a drive system 9, and a base 8. As discussed in more detail below, powered actuator 11 and drive system 9 may also comprise known devices that are configured to provide linear movement and acceleration of table 12. The rotational axis R1 is preferably aligned with the earths' gravity vector. The independent variables in the system that need to be considered for calibration purposes are mass location, mass quantity, rotational velocity, and balance orientation.

Connecting structures or brackets 16A and 16B are rigidly secured to metric end 5 of balance 1, and elongated vertically extending plates 18A and 18B are rigidly secured to the connection structures/brackets 16A and 16B, respectively. Although various connecting arrangements could be utilized, in the illustrated example threaded fasteners 20 connect the plates 18 to the connecting structures 16. A plurality of rigid arms 22A-22F are secured to the vertical plates 18A and 18B by threaded fasteners 24. Support plates 26A-26F of arms 22 rigidly support one or more test masses 28 having known masses.

Because the magnitude of the test masses 28, the location of the test masses 28, and the angular velocity of rotational table 12 is known, the total (expected) forces acting on force balance 1 can be calculated. A series of tests at different angular velocities can be performed to vary the forces acting on force balance 1 to thereby calibrate the force balance 1.

Also, opposing force vector loading schemes can be achieved by attaching mass on opposite sides of rotational axis R1. These coupled opposing force vectors allow for pure moment application to the force balance 1. As a result, the centered calibration system 10 is capable of employing a unique combination of simultaneously applied loads. An accelerometer package 30 is mounted to an upper end 32 of the calibration system 10, and the coordinate system of the balance 1 is aligned with the coordinate system of the accelerometer package 30. Deflection of the force balance 1 can be determined utilizing accelerometer package 30, and the deflections can be taken into account with respect to the position of the test mass 28 when the applied loads/forces are calculated. Signals from the attitude sensing system 30 and force balance 1 are transmitted through the rotating table 12 utilizing slip rings (not shown). The various structural components and the accelerometer package 30 are preferably mounted utilizing dowels or the like to ensure that the components are assembled and aligned in a repeatable configuration.

A second "off-center" rotating system 40 (FIG. 4) includes an elongated horizontal plate 42 that is secured to rotational table 12. An angled mounting plate structure 44 is rigidly secured to the horizontal plate 42, and balance 1 is mounted to angled surface 46 of mounting plate structure 44 by a mounting ring 48 or the like. The axis "A" of balance 1 extends at an angle θ relative to the rotational axis "R1" of rotational table 12. Rotational axis R1 is preferably aligned with the gravitational vector of the earth.

The independent variables of the system 40 are the pitch angle, roll angle, attached mass, arm bracket location and balance position on the table 12. In contrast to the centered system 10, there is only one place where the applied force vector acts, which is at the center of gravity 50 of test masses 52A and 52B, and plate 54, connecting structure 56 and other masses connected to balance 1. For each loading configuration, the mass is equally spaced so that the center of gravity 50 of the group of masses is coincident with the axis A of the balance 1. The off-center system applies a single force vector, and is therefore subjected to the single force vector loading constraint shown in equation (5).

$$-(RM)(AF)+(PM)(SF)-(YM)(NF)=0 \quad (5)$$

Figure 5:
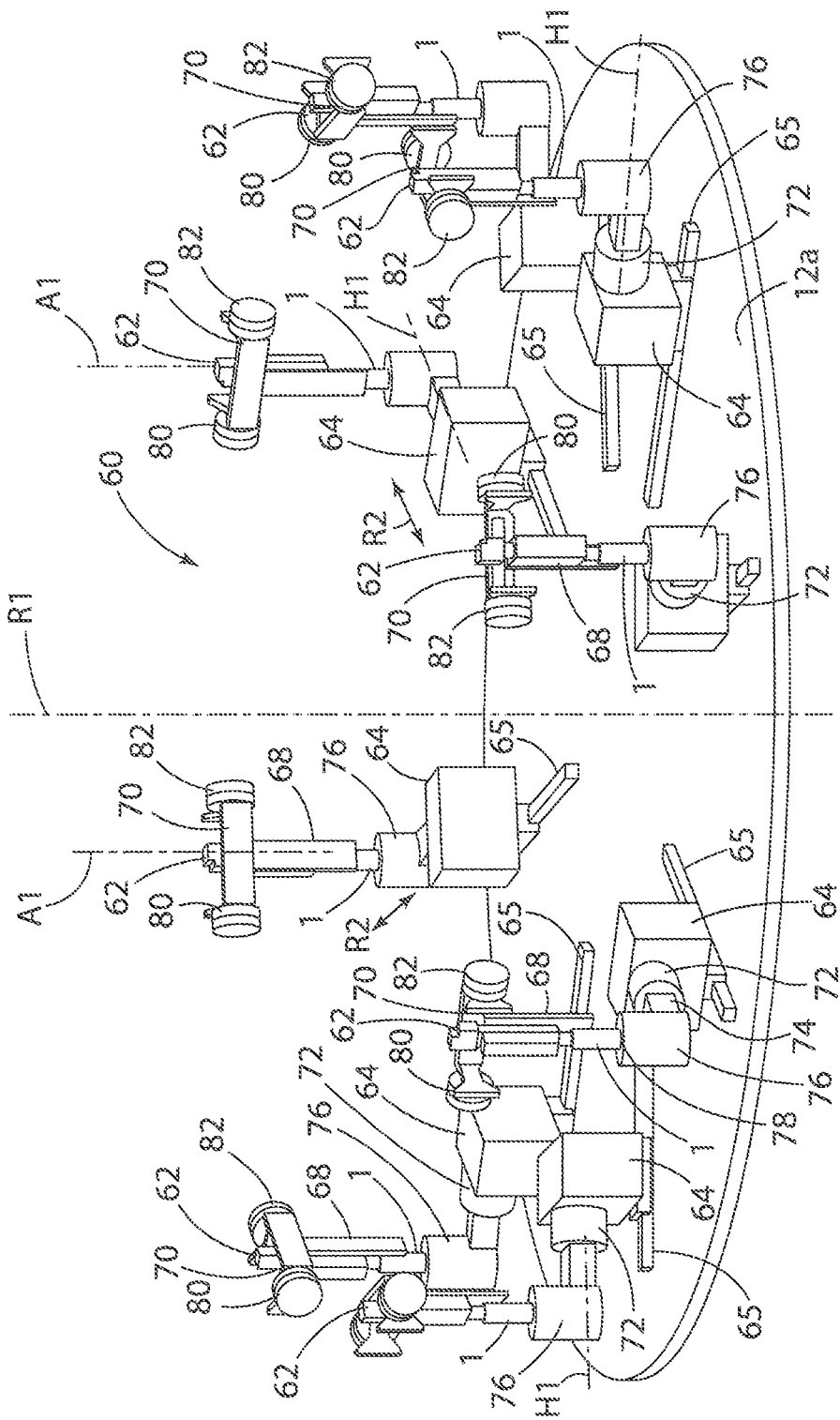
FIG. 5 is an isometric view of a system for simultaneously calibrating multiple force balances.

With further reference to FIG. 5, a calibration system 60 according to another aspect of the present invention includes a rotational table 12A and a plurality of individual calibration units 62. Each unit 62 includes a base 64 that is movably mounted to a linear guide 65. The linear guides extend radially outwardly from the axis of rotation "R1" of the table 12a. The linear guides 65 preferably comprise powered actuators that shift the bases 64 of the calibration units 62 in a linear, radial direction along horizontal axes "H1" as shown by the arrows "R2". Various electrical or hydraulic powered actuators or the like may be utilized for the linear guides 65.

Each calibration unit 62 includes a first powered rotary joint 72, a short horizontally extending arm 74, and a second rotary joint 76. The force balances 1 are received in end connectors 78 of the second rotary joints 76, and one or more test weights 80 and 82 are connected to the upper ends of force balances 1 by support plates/brackets 68 and 70. The support plates/brackets 68 and 70 may be substantially similar to the corresponding structures described above in connection with the force calibration system 40 of FIG. 4.

In use, each individual calibration unit 62 may be moved to a specified radial position by selectively actuating powered linear guides 65. It will be understood that the linear guides 65 may include a sensor that provides feedback to a controller (not shown) whereby the controller receives information concerning the position of each calibration unit 62.

Also, the rotary actuators 72 can be utilized to rotate the individual force balances 1 about their horizontal axes H1 extending radially outward from the axis of rotation "R1" of the rotary table 12A. Furthermore, each force balance 1 can also be rotated about an axis A1 upon actuation of powered rotary actuator 76. The powered rotary actuators 72 and 76 may comprise electrically powered units having sensors or the like that provide information concerning the rotary angles of the components to a controller (not shown).

In use, the linear actuator 65 and powered rotary actuators 72 and 76 are actuated to position the test weights 80 and 82 in an initial position, and the table 12A is then rotated at a selected angular velocity. In the illustrated example (FIG. 5), 8 individual force balances 1 can be calibrated simultaneously. However, it will be understood that fewer force balances 1 may also be simultaneously calibrated utilizing the calibration system 60 of FIG. 5. Furthermore, additional calibration units 62 may be mounted to table 12A utilizing additional linear guides 65 to provide for simultaneous calibration of more than 8 force balances 1.

After the measurements for a first angular velocity and position of test weights 80 and 82 is taken, the test weights 80 and 82, along with force balance 1, can be moved to a second position by actuation of one or more of powered actuators 65, 72, and 76. In this way, the positions of the test weights 80 and 82 can be changed without stopping rotation of table 12A, and without resetting the individual calibration units 62 and test weights 80 and 82.

The expected forces to be generated by the test weights 80 and 82 can be calculated for a plurality of angular velocities of rotational table 12a, and positions of test weights 80 and 82. The individual force balances 1 can then be calibrated. It will be understood that the variables and equations utilized to calibrate the individual force balances 1 in the system 60 of FIG. 5 are substantially the same as described above in connection with the systems 10 and 40 of FIGS. 3 and 4, respectively.

The calibration systems 10 and 40 described above may also be mounted to a linearly-oscillating table or other device that provides linear acceleration instead of rotational table 12. Various types of tables and devices that are capable of generating linear acceleration are known in the art. For example, a linearly-oscillating table may provide sinusoidal acceleration of a known magnitude may be utilized. A table or other such device providing a period of constant acceleration may also be utilized. The forces imparted by the test mass due to linear acceleration are of the form F=ma. Equations of this type are well-known in the art, and they will not therefore be described in detail herein. It will be understood that flexing of the fixtures supporting the test mass may need to be taken into account under certain circumstances.

The invention claimed is:

1. A method of calibrating a force balance, the method comprising:
   providing a force balance to be calibrated;
   operably interconnecting a mass of a known magnitude to the force balance whereby acceleration forces acting on the mass are reacted solely by the force balance;
   causing the mass to accelerate at a known rate while the mass is moving to generate a force on the force balance;
   determining an expected force acting on the force balance based on the magnitude of the mass and the known acceleration of the mass;
   adjusting an output of the force balance to provide a measured force that is substantially equal to the expected force.

2. The method claim 1, wherein:
   the mass moves in a circular path about an axis of rotation at a known angular velocity and the force is due, at least in part, to a centripetal acceleration acting on the mass as a result of movement of the mass about the axis of rotation at the known angular velocity.

3. The method of claim 2, wherein:
   the known angular velocity comprises a first known angular velocity and the expected force comprises a first expected force determined for the first known angular velocity; and including:
   causing the mass to move in a circular path about the axis of rotation at a second known angular velocity that is not equal to the first known angular velocity to generate a second force on the force balance;
determining a second resulting force;
adjusting an output of the force balance to provide a second measure force that is substantially equal to the second expected force.

4. The method of claim 3, wherein:
the mass moves in the same circular path at the first known angular velocity and at the second known angular velocity.

5. The method of claim 2, including:
providing a rotational table that rotates about the axis of rotation;
mounting the force balance to the table;
rotating the table about the axis of rotation to cause the mass to move in a circular path.

6. The method of claim 5, wherein:
wherein providing a force balance comprises providing a force balance of the type that is elongated with first and second opposite ends and a center of mass;
mounting the first end of the force balance to the rotational table with the center of mass of the force balance aligned with the axis of rotation;
attaching the mass to the second end of the force balance with the mass being spaced-apart from the axis of rotation.

7. The method of claim 6, including:
providing a balance fixture;
mounting the balance fixture to the second end of the force balance, the balance fixture including first and second equal masses that are spaced-apart from the axis of rotation and at equal distances in opposite directions.

8. The method of claim 7, wherein:
the first and second masses are spaced apart along the axis of rotation relative to one another; and including:
rotating the rotational table in a manner that results in the first and second masses generating a moment acting on the force balance without generating a linear force acting on the force balance.

9. The method claim 7, wherein:
the step of providing a balance fixture includes providing a balance fixture having a generally upright center structure and a plurality of pairs of arms, each pair of arms extending in opposite directions from the center structure and including mass attachment members at ends of the arms; and wherein:
masses are attached to selected ones of the mass attachment members.

10. The method of claim 1, wherein:
the mass is accelerated linearly.

11. The method of claim 10, wherein:
the mass is moved linearly in an oscillating manner.

12. The method of claim 11, wherein:
the acceleration is sinusoidal.

13. A method of calibrating a force balance, the method comprising:
providing a force balance to be calibrated;
operably interconnecting a mass of a known magnitude to the force balance whereby accelerating forces acting on the mass are reacted solely by the force balance;
causing the mass to accelerate at a known rate while the mass is moving to generate a force on the force balance;
determining an expected force acting on the force balance based on the magnitude of the mass and the known acceleration of the mass;
adjusting an output of the force balance to provide a measured force that is substantially equal to the expected force;
wherein the force balance comprises a first force balance, and the mass comprises a first mass; the method further including:
providing a second force balance;
operably interconnecting a second mass to the second force balance;
causing the first and second force balances to accelerate simultaneously whereby first and second forces act on the first and second force balances simultaneously;
determining a first and second expected forces based on the magnitudes and accelerations of the first and second masses, respectively;
adjusting outputs of the first and second force balances to provide first and second measured forces that are substantially equal to the expected forces.

14. The method of claim 13, including:
providing a powered rotational structure;
securing the first and second force balances to the rotational structure;
rotating the rotational structure to cause the first and second force balances to simultaneously move in a rotational manner.

* * * * *